United States Patent
Yang

(10) Patent No.: US 11,912,277 B2
(45) Date of Patent: Feb. 27, 2024

(54) METHOD AND APPARATUS FOR CONFIRMING BLINDSPOT RELATED TO NEARBY VEHICLE

(71) Applicant: Mobile Drive Netherlands B.V., Amsterdam (NL)

(72) Inventor: Jing-Long Yang, New Taipei (TW)

(73) Assignee: Mobile Drive Netherlands B.V., Amsterdam (NL)

( * ) Notice: Subject to any disclaimer, the term of this patent is extended or adjusted under 35 U.S.C. 154(b) by 128 days.

(21) Appl. No.: 17/551,495

(22) Filed: Dec. 15, 2021

(65) Prior Publication Data
US 2022/0194374 A1 Jun. 23, 2022

(30) Foreign Application Priority Data
Dec. 19, 2020 (CN) .......................... 202011509793.1

(51) Int. Cl.
*B60W 30/16* (2020.01)
*B60W 30/18* (2012.01)

(52) U.S. Cl.
CPC .... *B60W 30/162* (2013.01); *B60W 30/18154* (2013.01); *B60W 2520/10* (2013.01); *B60W 2520/12* (2013.01); *B60W 2552/05* (2020.02); *B60W 2552/10* (2020.02); *B60W 2554/4041* (2020.02); *B60W 2554/4042* (2020.02); *B60W 2554/4043* (2020.02); *B60W 2554/801* (2020.02); *B60W 2554/802* (2020.02); *B60W 2554/803* (2020.02); *B60W 2554/804* (2020.02);
(Continued)

(58) Field of Classification Search
CPC ......... B60W 30/162; B60W 30/18154; B60W 2554/4041; B60W 2554/802; B60W 2554/804; B60W 2554/803; B60W 2554/4042; B60W 2554/4043; B60W 2754/50; B60W 2754/30; B60W 2552/05; B60W 2552/10; B60W 2520/10; B60W 2520/12; B60W 2720/10; B60W 2720/12
USPC .......................................................... 701/96
See application file for complete search history.

(56) References Cited

U.S. PATENT DOCUMENTS

| | | | | |
|---|---|---|---|---|
| 5,875,408 A | * | 2/1999 | Bendett | G01S 17/10 356/3.01 |
| 8,798,841 B1 | * | 8/2014 | Nickolaou | B62D 15/0265 701/28 |

(Continued)

FOREIGN PATENT DOCUMENTS

| | | |
|---|---|---|
| CN | 110789483 A | 2/2020 |
| CN | 111267844 A | 6/2020 |

*Primary Examiner* — Richard A Goldman
(74) *Attorney, Agent, or Firm* — ScienBiziP, P.C.

(57) ABSTRACT

A method for providing driving assistance by detecting and warning against areas on one or other side of the road which are obscured by vehicles in other lanes is based on a HD map and includes acquiring location and driving speed of a vehicle which is carrying an apparatus applying the method. The system of the method includes at least one sensor, and environmental information as to surroundings is acquired with location. The speeds of other vehicles relative to the driving speed of the vehicle are calculated, and an instruction to the driver is generated the speed of the vehicle is less than a first predefined value but the speed of the vehicle relative to the driving speeds of the other vehicles is larger than a second predefined value. The apparatus applying the method is also disclosed.

16 Claims, 6 Drawing Sheets

(52) U.S. Cl.
CPC ..... *B60W 2720/10* (2013.01); *B60W 2720/12* (2013.01); *B60W 2754/30* (2020.02); *B60W 2754/50* (2020.02)

(56) References Cited

U.S. PATENT DOCUMENTS

| | | | | |
|---|---|---|---|---|
| 8,874,267 B1* | 10/2014 | Dolgov | ................ | B60W 30/09 701/28 |
| 2003/0007263 A1* | 1/2003 | Morrison | ................ | B60R 1/007 359/860 |
| 2008/0252482 A1* | 10/2008 | Stopczynski | .......... | G08G 1/165 342/70 |
| 2008/0254417 A1* | 10/2008 | Mohamed | ................ | G09B 9/04 434/69 |
| 2011/0157730 A1* | 6/2011 | Lewis | .................... | B60R 1/006 359/843 |
| 2012/0095920 A1* | 4/2012 | McQuade | ............. | H04L 9/3226 713/168 |
| 2014/0267282 A1* | 9/2014 | Ren | ....................... | G01C 21/367 345/428 |
| 2014/0279535 A1* | 9/2014 | Fadler | .................. | G07F 13/025 701/123 |
| 2016/0209840 A1* | 7/2016 | Kim | ..................... | B60W 50/082 |
| 2017/0039856 A1* | 2/2017 | Park | ....................... | G01C 21/34 |
| 2017/0345311 A1* | 11/2017 | Sugiura | ................. | G06V 20/58 |
| 2018/0004020 A1* | 1/2018 | Kunii | .................... | B60Q 1/381 |
| 2018/0095465 A1* | 4/2018 | Gao | ....................... | G05D 1/0257 |
| 2018/0290657 A1* | 10/2018 | Ryne | ..................... | B60W 10/20 |
| 2019/0278990 A1* | 9/2019 | Mansour | ................... | G06T 7/10 |
| 2020/0020235 A1* | 1/2020 | Smith | ....................... | B60R 1/00 |
| 2020/0164799 A1* | 5/2020 | Nowakowski | ........... | B60R 1/00 |
| 2020/0278681 A1* | 9/2020 | Gier | ....................... | G05D 1/0246 |
| 2020/0285869 A1* | 9/2020 | Mansour | ................ | G06N 5/046 |
| 2020/0310425 A1* | 10/2020 | Ghose | ................... | B60W 30/09 |
| 2021/0316734 A1* | 10/2021 | Honda | ................... | G06V 20/584 |
| 2022/0194374 A1* | 6/2022 | Yang | ................... | B60W 30/162 |
| 2023/0103248 A1* | 3/2023 | Abrash | ................. | B60W 10/04 701/26 |
| 2023/0135702 A1* | 5/2023 | Oh | .................... | B60W 30/0953 701/26 |

* cited by examiner

METHOD AND APPARATUS FOR CONFIRMING BLINDSPOT RELATED TO NEARBY VEHICLE

FIELD

The subject matter herein generally relates to traffic safety.

BACKGROUND

Road traffic is becoming heavier and traffic safety becomes more important. A view of a driver can be blocked by vehicles in adjacent lanes. A blind area is formed by the vehicles in adjacent lanes, and an accident may happen when a pedestrian or a vehicle crosses the road from the blind area, or a crash in the adjacent lanes occurs. Such blind areas can occur without any warning for drivers.

Thus, there is room for improvement in the art.

BRIEF DESCRIPTION OF THE FIGURES

Implementations of the present disclosure will now be described, by way of example only, with reference to the attached figures.

DETAILED DESCRIPTION

Figure 1:
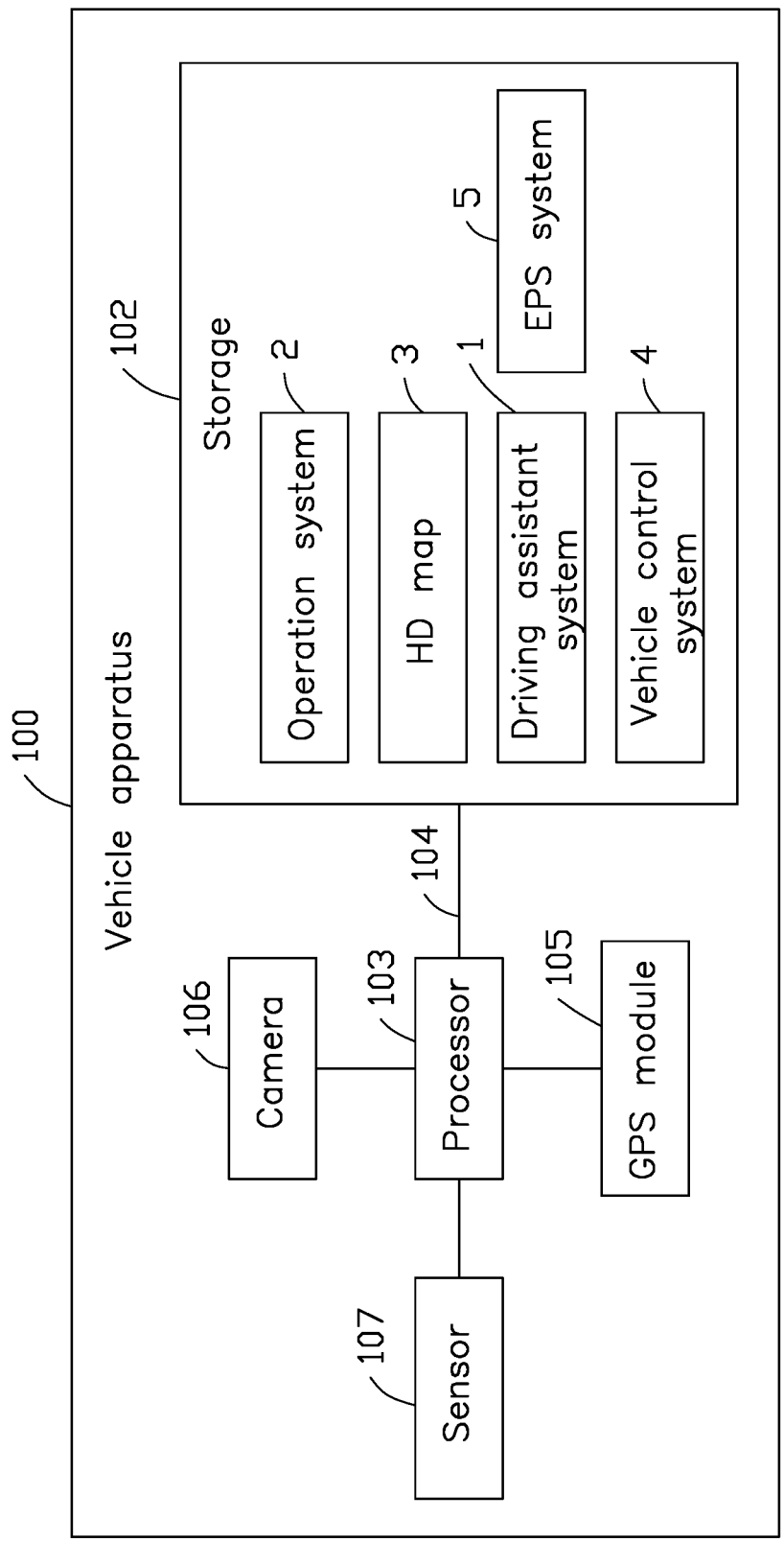
FIG. 1 is a diagram illustrating an embodiment of a vehicle apparatus, the vehicle apparatus comprising a driving assistance system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

The present disclosure provides a vehicle apparatus for giving warning about a blind area while driving.

FIG. 1 shows a vehicle apparatus 100. The vehicle apparatus 100 includes a storage 102, a processor 103, a data bus 104, a global positioning system (GPS) module 105, a camera 106, and at least one sensor 107.

Figure 3:
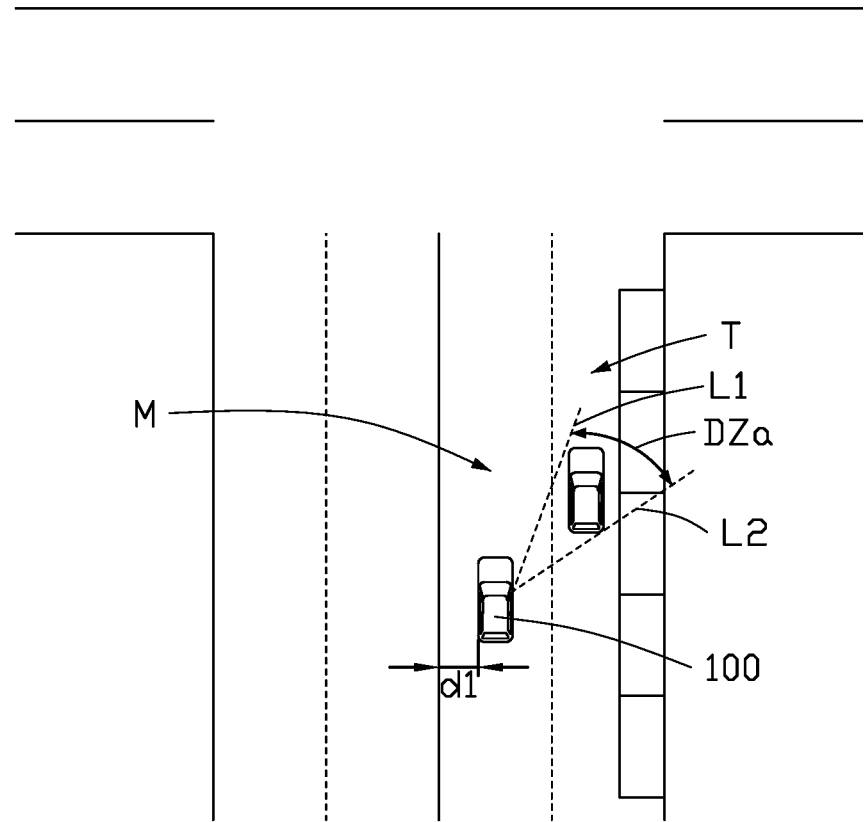
FIG. 3 is a diagram illustrating an embodiment of a dynamic blind area revealed by the system of FIG. 1.
Figure 4:
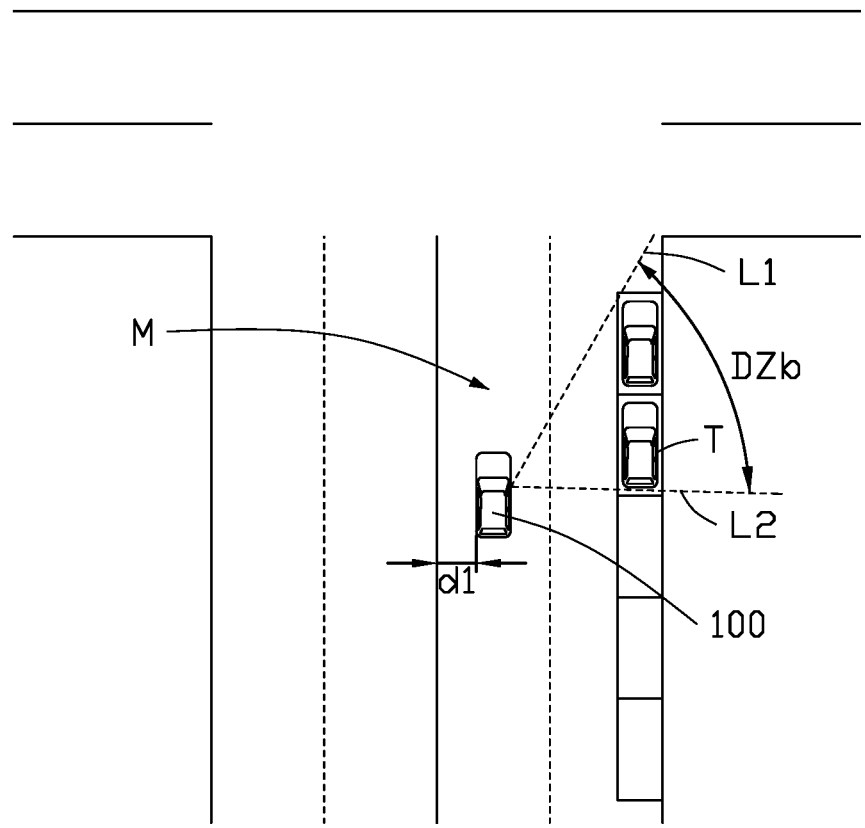
FIG. 4 is a diagram illustrating an embodiment of a static blind area revealed by the system of FIG. 1.
Figure 5:
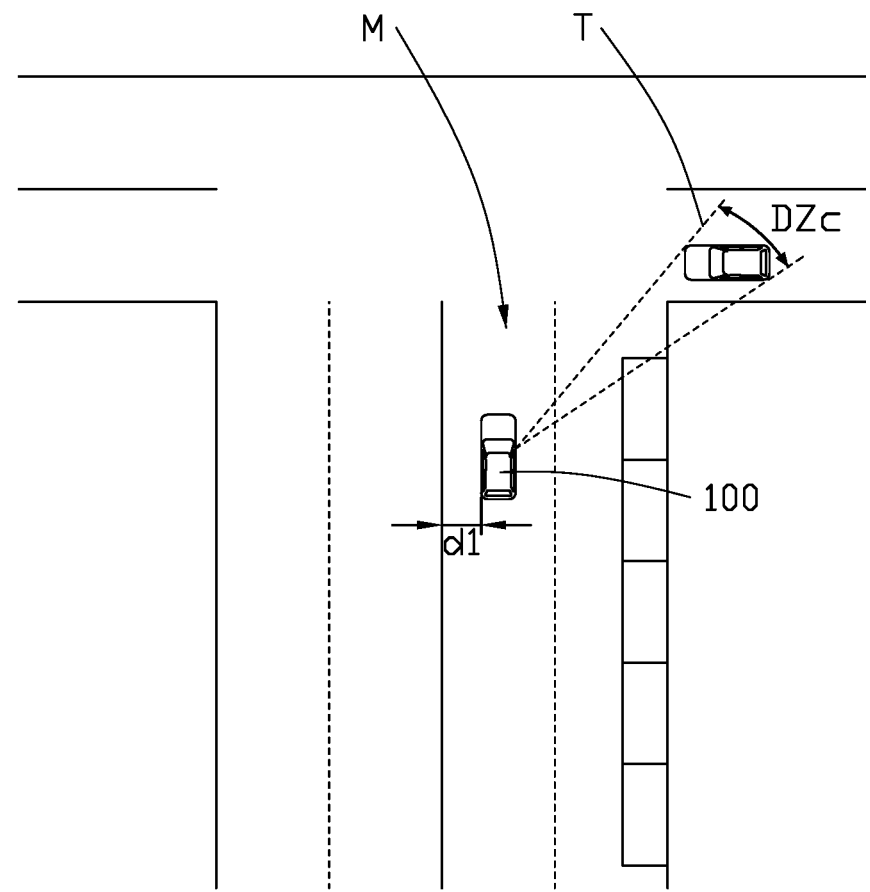
FIG. 5 is a diagram illustrating an embodiment of a junction blind area revealed by the system of FIG. 1.

The vehicle apparatus 100 acquires a real-time position of the vehicle and a driving speed of the vehicle, determines an environment information surrounding the vehicle through the at least one sensor 107, and detects whether there is other vehicle(s) in a target lane (as shown in FIGS. 3 to 5). When the vehicle apparatus 100 is in a blind area detecting mode, driving speed(s) of the other vehicle(s) in the target lane is computed and relative speed of the vehicle to the driving speed(s) of the other vehicle(s) in the target lane. The vehicle apparatus 100 compares the driving speed of the vehicle against a first predefined value, and further compares the relative speed against a second predefined value, and confirms the existence or absence of a blind area. The vehicle apparatus 100 can further control the vehicle when the blind area exists in the target lane.

The storage 102 stores program codes. The storage 102 can be an embedded circuit having a storing function, such as a memory card, a trans-flash (TF) card, a smart media card, a secure digital card, and a flash card, and so on. The storage 102 transmits data with the processor 103 through the data bus 104. The storage 102 stores a driving assistance system 1, an operation system 2, and a high-definition (HD) map 3.

The operation system 2 manages and controls hardware and software programs. The operation system 2 further supports operations of the driving assistance system 1 and other software and programs.

The HD map 3 includes a lane information, lane symbols, speed limit information, and so on. In at least one embodiment, the lane information includes information such as a left turn lane, a right turn lane, and a straight-on lane. In other embodiments, the lane information can further include information such as an un-dedicated lane in relation to traffic directions or maneuvers, not being limited hereto. In one embodiment, lane symbols can be a left turn arrow, a combined left turn and straight-on arrow, an arrow for a straight-on only lane, and a right turn arrow, not being limited hereto. The speed limit information can include speed limit symbols and symbols removing speed limits.

Figure 2:
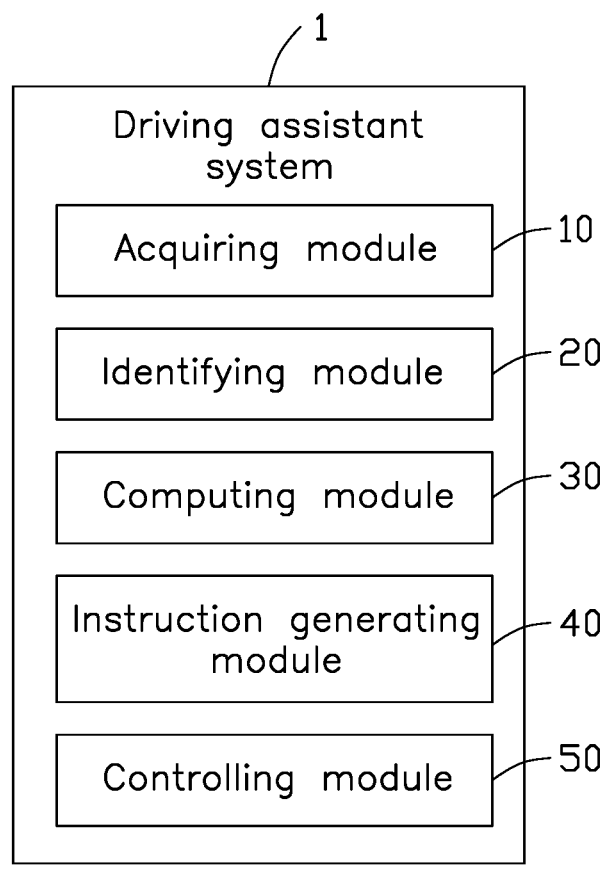
FIG. 2 is a diagram illustrating an embodiment of the driving assistance system of FIG. 1.

The processor 103 can be a micro-processor or a digital processor. The processor 103 is used for running the program codes stored in the storage 102 to execute different functions. Modules in FIG. 2 are program codes stored in the storage 102 and are implemented by the processor 103 for executing a method for driving assistance. The processor 103 can be a central processing unit (CPU), or a large scale integrated circuit, being an operating core and a control core.

The data bus 104 transmits data with the storage 102 and the processor 103.

The GPS module 105 locates the real-time position of the vehicle (such as longitude and latitude information) and the point in time.

The camera 106 can capture still images and record video while driving. In at least one embodiment, the camera 106 can be set inside or beside the vehicle. For example, the camera 106 can be a data recorder inside the vehicle or a camera on a rearview mirror outside the vehicle. When the camera 106 is outside the vehicle, the processor 103 can control the camera 106 to completely rotate.

The at least one sensor 107 can detect a distance between the vehicle and other vehicles. In at least one embodiment, the at least one sensor 107 can include a radar sensor, a speed sensor, and an acceleration sensor, not being limited hereto.

FIG. 2 shows the driving assistance system 1. The driving assistance system 1 includes a plurality of modules.

An acquiring module 10 acquires a real-time position of the vehicle and a driving speed of the vehicle, and determines an environment information surrounding the vehicle according to the real-time position of the vehicle and the HD map 3.

In at least one embodiment, the environment information can include a driving lane M (as shown in FIG. 3), a target lane T (as shown in FIG. 3), a width of the driving lane, and a width of the target lane T. The target lane T can be a lane adjacent to the driving lane M. In one embodiment, the target lane T can be a lane on a left side of the driving lane M (as shown in FIG. 3), a lane on a right side of the driving lane (as shown in FIG. 4), and a lane intersecting with the driving lane M (as shown in FIG. 5).

An identifying module 20 identifies other vehicle(s) in the target lane T when the vehicle apparatus 100 is in a blind area detecting mode. The identifying module 20 identifies the other vehicle(s) in the target lane T through the camera 106 and the at least one sensor 107, which communicate with each other through the data bus 104.

In one embodiment, the blind area detecting mode can be turned on or turned off according to driver's requirement. The driver can press a button on a display of the vehicle apparatus 100 for setting the blind area detecting mode. The button can be a physical button or a virtual button. The blind area detecting mode may be set to turn off while driving on the open highway, and activates while driving on an urban road.

A computing module 30 computes driving speed(s) of the other vehicle(s) in the target lane T, and relative speed(s) of the vehicle to the driving speed(s) of the other vehicle(s).

In one embodiment, the driving speed(s) of the other vehicle(s) (OV speeds) are computed according to a movement distance and the time information on the HD map 3. The relative speed(s) of the vehicle to the OV speed(s) in the target lane T can be computed according to a relative distance difference in a specified time. The relative distance is a distance of the vehicle to the vehicle(s) in the target lane T. The relative speed(s) is less than the driving speed of the vehicle.

An instruction generating module 40 generates an instruction when the driving speed of the vehicle is less than a first predefined value and the relative speed of the vehicle to the OV speed(s) in the target lane T is larger than a second predefined value.

In one embodiment, the comparison between the driving speed of the vehicle and the first predefined value is used for recognizing a slowing down action. The comparison between the relative speed and the second predefined value is used for recognizing an overtaking action. The blind area DZ can be displayed in the display of the vehicle or displayed in the vehicle.

In one embodiment, the blind area DZ can be (see FIG. 4) a dynamic blind area DZa, a static blind area DZb, or a junction blind area DZc. The blind area DZ is substantially in a sector shaped by a first line L1 and a second line L2. In other embodiments, the blind area DZ can be defined by other manner. For example, a region scanned by a radar can be defined as the blind area DZ which is being blocked by the other vehicle(s) in the target lane T.

As shown in FIG. 3, the dynamic blind area DZa is existed in the target lane T having a driving direction same as that of the driving lane, and is determined to be in a zone blocked by the one other vehicle in the target lane T. The first line L1 is a line connecting the vehicle and a front end of the other vehicle in the target lane T. The second line L2 is a line connecting the vehicle and a rear end of the other vehicle in the target lane T. The relative speed(s) is larger than the second predefined value within the dynamic blind area DZa.

As shown in FIG. 4, the static blind area DZb is existed in the target lane T having a driving direction same as that of the driving lane, and is determined to be in a zone blocked by the other vehicles in the target lane T. The relative speed(s) is equal to the driving speed of the vehicle within the static blind area DZb. In one embodiment, there are at least two other vehicles in the target lane T. The first line L1 is a line connecting the vehicle and a first other vehicle in the target lane T, which is in front of the vehicle. The second line L2 is a line connecting the vehicle and the last other vehicle in the target lane T, which is adjacent to or beyond the vehicle.

As shown in FIG. 5, the junction blind area DZc is existed in the target lane T, which intersects with the driving lane, and is determined to be in a zone blocked by the one other vehicle in the target lane T. In one embodiment, the junction blind area DZc is existed in the target lane T adjacent to the intersection of the target lane T and the driving lane. The first line L1 is a line connecting the vehicle and a front end of the other vehicle in the target lane T. The second line L2 is a line connecting the vehicle and a rear end of the other vehicle in the target lane T.

A controlling module 50 computes a driving speed which is considered safe (safety speed) according to the relative speed and reduces the driving speed of the vehicle to the safety speed while the instruction includes a speed reducing instruction.

The control module 50 further computes an offset distance d1 according to the width of the driving lane M and the driving speed of the vehicle, and controls the vehicle to move the offset distance d1 along a direction away from the other vehicle(s) in the target lane T when the instruction include a moving instruction.

In one embodiment, the controlling module 50 is an advanced driving assistance system (ADAS), and cooperates with the vehicle control system 4 and an electric power steering (EPS) system 5, which are stored in the storage 102, not being limited.

Based on the vehicle apparatus 100, the driving speed of the vehicle and the relative speed to the OV speeds are used for confirming that the blind area exists or does not exist, a reaction time is provided for the driver when there are more than one blind areas existing. Thus, safety while driving the vehicle is improved, and a smart control of the vehicle is improved.

Figure 6:
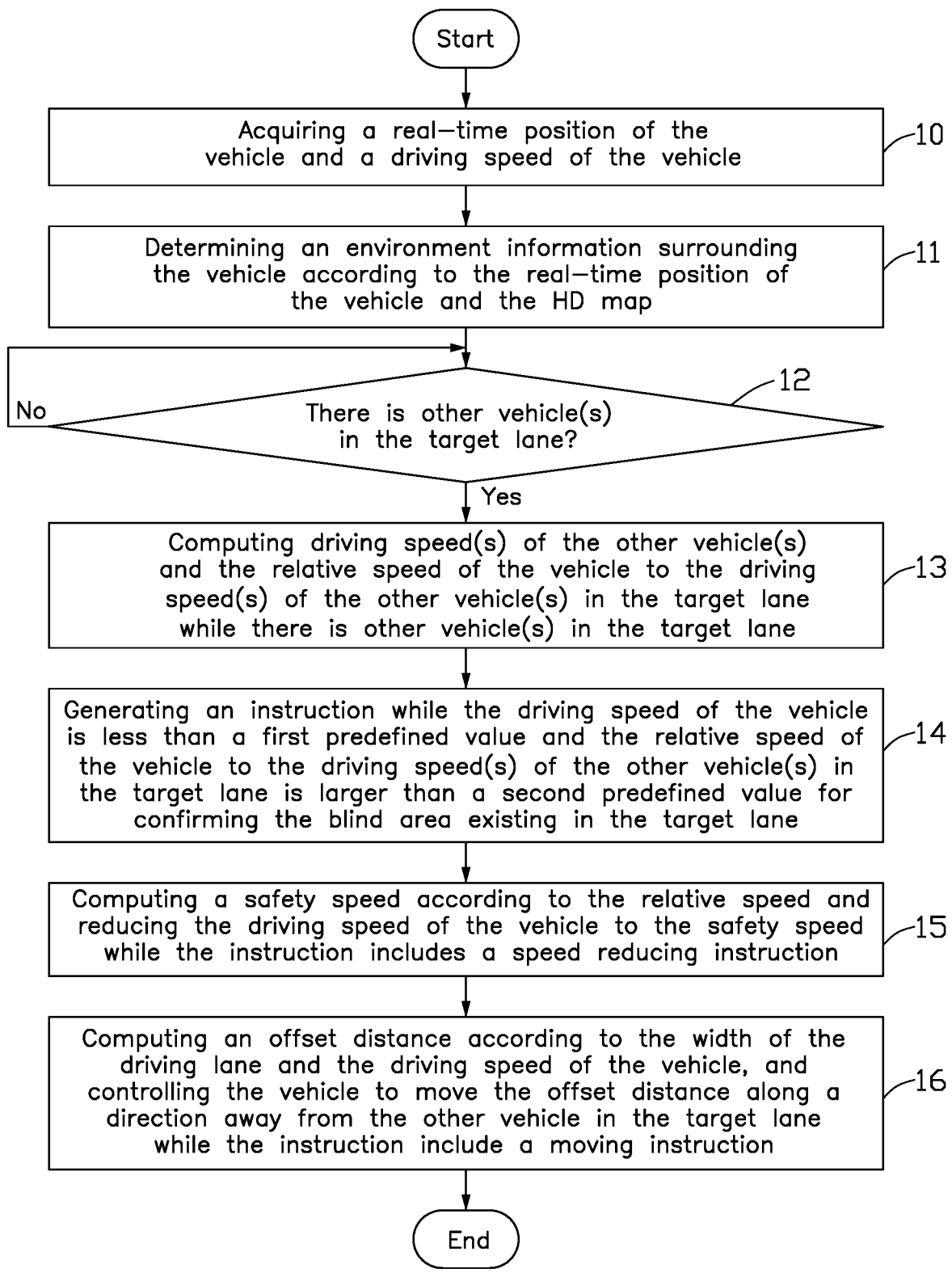
FIG. 6 is a flowchart illustrating an embodiment of a method for providing driving assistance to a driver.

FIG. 6 shows a flowchart of a method for the above. The vehicle apparatus 100 processes the program codes in the storage 102 by the processor 103 to execute the acquiring module 10, the identifying module 20, the computing module 30, the instruction generating module 40, the controlling module 50, and communicates with the GPS module 105, the camera 106, and at least one sensor 107 to execute the method for providing driving assistance.

The method may comprise at least the following steps, which also may be re-ordered:

In block 10, the acquiring module 10 acquires a real-time position of the vehicle and a driving speed of the vehicle.

In block 11, the acquiring module 10 determines an environment information surrounding the vehicle according to the real-time position of the vehicle and the HD map 3.

In at least one embodiment, the environment information can include a driving lane M (as shown in FIG. 3), a target lane T (as shown in FIG. 3), a width of the driving lane, and a width of the target lane T. The target lane T can be a lane adjacent to the driving lane M. In one embodiment, the target lane T can be a lane on a left side of the driving lane M (as shown in FIG. 3), a lane on a right side of the driving lane (as shown in FIG. 4), and a lane intersecting with the driving lane M (as shown in FIG. 5).

In block S12, the identifying module 20 detects whether there is other vehicle(s) in the target lane T when the vehicle apparatus 100 is in a blind area detecting mode.

When there is other vehicle(s) in the target lane T, the procedure goes to the block S13.

When there is no other vehicle in the target lane T, the procedure returns to the block S11.

In one embodiment, the blind area detecting mode can be turned on or turned off according to driver's requirement. The driver can press a button on a display of the vehicle apparatus 100 for setting the blind area detecting mode. The button can be a physical button or a virtual button. The blind area detecting mode may be set to turn off while driving on the open highway, and activates while driving on an urban road.

In block 13, the computing module 30 computes driving speed(s) of the other vehicle(s) and relative speed of the vehicle to the driving speed(s) of the other vehicle(s) in the target lane T while there is other vehicle(s) in the target lane T.

In one embodiment, the driving speed of the other vehicle(s) is computed according to a movement distance and the time information on the HD map 3. The relative speed of the vehicle to the driving speed of the other vehicle(s) in the target lane T can be computed according to a relative distance difference in a specified time. The relative distance is a distance of the vehicle to the other vehicle(s) in the target lane T. The relative speed is less than the driving speed of the vehicle.

In block 14, the instruction generating module 40 generates an instruction when the driving speed of the vehicle is less than a first predefined value and the relative speed of the vehicle to the driving speed(s) of the other vehicle(s) in the target lane T is larger than a second predefined value, which confirms the blind area existing in the target lane T.

In one embodiment, the comparison between the driving speed of the vehicle and the first predefined value is used for recognizing a slowdown action. The comparison between the relative speed and the second predefined value is used for recognizing an overtaking action. The blind area DZ can be displayed in the display of the vehicle or in the vehicle.

In one embodiment, the blind area DZ can be a dynamic blind area DZa, a static blind area DZb, or a junction blind area DZc. The blind area DZ is substantially in a sector shaped formed by a first line L1 and a second line L2. In other embodiments, the blind area DZ can be defined by other manner. For example, a region scanned by a radar is defined as the blind area DZ being blocked by the other vehicle(s) in the target lane T.

As shown in FIG. 3, the dynamic blind area DZa is existed in the target lane T having a driving direction same as that of the driving lane, and is determined to be in a zone blocked by the one other vehicle in the target lane T. The first line L1 is a connection line between the vehicle and a front end of the other vehicle in the target lane T. The second line L2 is a connection between the vehicle and a rear end of the other vehicle in the target lane T. In the dynamitic blind area DZa, the relative speed(s) is larger than the second predefined value within the dynamic blind area DZa.

As shown in FIG. 4, the static blind area DZb is existed in the target lane T having a driving direction same as that of the driving lane, and determined to be in a zone is blocked by the other vehicle(s) in the target lane T. In the static blind area DZb, the relative speed(s) is equal to the driving speed of the vehicle within the static blind area DZb. In one embodiment, there are at least two other vehicles in the target lane T. The first line L1 is a connection line between the vehicle and a first other vehicle in the target lane T, which is in front of the vehicle. The second line L2 is a connection line between the vehicle and a last other vehicle in the target lane T, which is adjacent to or beyond the vehicle.

As shown in FIG. 5, the junction blind area DZc is existed in the target lane T, which is intersected with the driving lane, and is determined to be in a zone blocked by the one other vehicle in the target lane T. In one embodiment, the junction blind area DZc is existed in the target lane T adjacent to an intersection of the target lane T and the driving lane. The first line L1 is a connection line between the vehicle and a front end of the other vehicle in the target lane T. The second line L2 is a connection line between the vehicle and a rear end of the other vehicle in the target lane T.

In block 15, the controlling module 50 computes a safety speed according to the relative speed and reduces the driving speed of the vehicle to the safety speed when the instruction includes a speed reducing instruction.

In block 16, the control module 50 computes an offset distance d1 according to the width of the driving lane M and the driving speed of the vehicle, and controls the vehicle to move the offset distance d1 along a direction away from the other vehicle in the target lane T when the instruction include a moving instruction.

Based on the method for driving assistance based on the HD map 3, the driving speed of the vehicle and the relative speed of the vehicle to the driving speed(s) of the other vehicle(s) in the target lane T are used for confirming the blind area existing or not existing, a reaction time is provided for the driver when there is one or more blind area existed. Thus, safety while driving the vehicle is improved, and a smart control of the vehicle is optimized.

While various and preferred embodiments have been described the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. A driving assistance method utilizing a map in a vehicle apparatus of a vehicle, the driving assistance method comprising:
    acquiring a real-time position of the vehicle and a driving speed of the vehicle;
    determining an environment information surrounding the vehicle according to the real-time position of the vehicle and the map; the environment information comprising a driving lane, a target lane, a width of the driving lane, and a width of the target lane, wherein the target lane is adjacent to the driving lane;
    detecting whether other vehicle(s) is present in the target lane;
    computing driving speed(s) of detected vehicle(s), and computing relative speeds of the vehicle to the driving speed(s) of the detected vehicle(s) in the target lane when the other vehicle(s) is present in the target lane; and
    when the driving speed of the vehicle is less than a first predefined value and when the relative speeds of the vehicle to the driving speed(s) of the detected vehicle(s) in the target lane is larger than a second predefined value, generating an instruction to confirm a blind area existing in the target lane;
    wherein a first comparison between the driving speed of the vehicle and the first predefined value is configured for recognizing a slowdown action of the other vehicle(s), a second comparison between the relative speed and the second predefined value is configured for recognizing an overtaking action of the vehicle.

2. The driving assistance method of claim 1, wherein the blind area comprises a dynamic blind area; the dynamic blind area is determined to be in the target lane in a same direction as the driving lane, and is determined to be in an area occupied by the other vehicle(s) in the target lane.

3. The driving assistance method of claim 2, wherein the blind area comprises a static blind area; the static blind area is determined to be in the target lane in the same direction as the driving lane, and is determined to be in an area occupied by the other vehicle(s) in the target lane.

4. The driving assistance method of claim 1, wherein the blind area comprises a junction blind area; the junction blind area is determined to be located within the target lane that intersects with the driving lane, and is determined to be in an area occupied by the other vehicle(s) in the target lane; the junction blind area is determined to be located in the target lane adjacent to an intersection.

5. The driving assistance method of claim 1, further comprising:
    computing a safety speed according to the relative speed and reducing the driving speed of the vehicle to the safety speed when the instruction is a speed reducing instruction.

6. The driving assistance method of claim 1, further comprising:
    computing an offset distance according to the width of the driving lane and the driving speed of the vehicle, and controlling the vehicle to move the offset distance along a direction away from the other vehicle(s) in the target lane when the instruction is a moving instruction.

7. The driving assistance method of claim 1, further comprising:
    determining whether the vehicle is in a blind area detecting mode,
    detecting whether the other vehicle(s) is present in the target lane when the vehicle is determined to be in the blind area detecting mode.

8. The driving assistance method of claim 7, further comprising:
    determining whether the vehicle is on an urban road,
    activating the blind area detecting mode when the vehicle is on the urban road.

9. A vehicle apparatus applicable on a vehicle utilizing a map, the vehicle apparatus comprises a processor and a storage; the processor executes program codes stored in the storage to implement the following steps:
    acquiring a real-time position of the vehicle and a driving speed of the vehicle;
    determining an environment information surrounding the vehicle according to the real-time position of the vehicle and the map; the environment information comprising a driving lane, a target lane, a width of the driving lane, and a width of the target lane, wherein the target lane is adjacent to the driving lane;
    detecting whether other vehicle(s) is present in the target lane;
    computing driving speed(s) of the other vehicle(s) and relative speed of the vehicle relative to the driving speed(s) of the other vehicle(s) in the target lane while the other vehicle(s) is present in the target lane; and
    generating an instruction when the driving speed of the vehicle is less than a first predefined value and the relative speed of the vehicle to the driving speed(s) of other vehicle(s) in the target lane is larger than a second predefined value for confirming one or more blind area existing in the target lane;
    wherein a first comparison between the driving speed of the vehicle and the first predefined value is configured for recognizing a slowdown action of the other vehicle(s), a second comparison between the relative speed and the second predefined value is configured for recognizing an overtaking action of the vehicle.

10. The vehicle apparatus of claim 9, wherein the blind area comprises a dynamic blind area; the dynamic blind area is determined to be in the target lane in a same direction as the driving lane, and is determined to be in an area occupied by the other vehicle(s) in the target lane.

11. The vehicle apparatus of claim 10, wherein the blind area comprises a static blind area; the static blind area is determined to be in the target lane in the same direction as the driving lane, and is determined to be in a zone blocked an area occupied by the other vehicle(s) in the target lane.

12. The vehicle apparatus of claim 9, wherein the blind area comprises a junction blind area; the junction blind area is determined to be located within the target lane that intersects with the driving lane, and is determined to be in an area occupied by the other vehicle in the target lane; the junction blind area is determined to be located in the target lane adjacent to an intersection.

13. The vehicle apparatus of claim 9, further comprising:
    computing a safety speed according to the relative speed and reducing the driving speed of the vehicle to the safety speed when the instruction is a speed reducing instruction.

14. The vehicle apparatus of claim 9, further comprising:
    computing an offset distance according to the width of the driving lane and the driving speed of the vehicle, and controlling the vehicle to move the offset distance along a direction away from the other vehicle(s) in the target lane when the instruction is a moving instruction.

15. The vehicle apparatus of claim 9, further comprising:
determining whether the vehicle is in a blind area detecting mode,
detecting whether the other vehicle is present in the target lane when the vehicle is determined to be in the blind area detecting mode.

16. The vehicle apparatus of claim 15, further comprising:
determining whether the vehicle is on an urban rod,
activating the blind area detecting mode when the vehicle is on the urban road.

* * * * *